US011531815B2

(12) United States Patent
Yasuoka

(10) Patent No.: US 11,531,815 B2
(45) Date of Patent: Dec. 20, 2022

(54) INFORMATION PROCESSING APPARATUS AND NON-TRANSITORY COMPUTER READABLE MEDIUM STORING PROGRAM

(71) Applicant: FUJIFILM Business Innovation Corp., Tokyo (JP)

(72) Inventor: Daisuke Yasuoka, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 458 days.

(21) Appl. No.: 16/512,388

(22) Filed: Jul. 16, 2019

(65) Prior Publication Data

US 2020/0272697 A1    Aug. 27, 2020

(30) Foreign Application Priority Data

Feb. 26, 2019   (JP) .............................. JP2019-032822

(51) Int. Cl.
*G06F 40/30* (2020.01)
*G06K 9/62* (2022.01)
*G06F 40/211* (2020.01)
*G06F 40/268* (2020.01)
*G06V 30/10* (2022.01)
*G06V 10/40* (2022.01)

(52) U.S. Cl.
CPC ............ *G06F 40/30* (2020.01); *G06F 40/211* (2020.01); *G06F 40/268* (2020.01); *G06K 9/6267* (2013.01); *G06V 10/40* (2022.01); *G06V 30/10* (2022.01)

(58) Field of Classification Search
CPC ...... G06F 40/30; G06F 40/211; G06F 40/268; G06V 30/10; G06V 10/40; G06K 9/6267
See application file for complete search history.

(56) References Cited

U.S. PATENT DOCUMENTS

| 10,327,116 | B1* | 6/2019 | Gratton ................. H04W 64/00 |
| 10,331,967 | B1* | 6/2019 | Yang ..................... G06K 9/623 |
| 2003/0120133 | A1* | 6/2003 | Rao ........................ G16H 50/70 |
| | | | 600/300 |
| 2009/0006343 | A1* | 1/2009 | Platt ...................... G06F 16/242 |
| 2009/0006344 | A1* | 1/2009 | Platt ................. G06F 16/90332 |
| 2013/0332438 | A1* | 12/2013 | Li ...................... G06F 16/24575 |
| | | | 707/706 |
| 2015/0279354 | A1* | 10/2015 | Gruenstein ............ G10L 15/22 |
| | | | 704/235 |
| 2018/0121394 | A1 | 5/2018 | Denoue et al. |
| 2019/0102480 | A1* | 4/2019 | Sreedhara ............... G10L 15/02 |
| 2019/0130110 | A1* | 5/2019 | Lee ......................... G06F 21/57 |
| 2019/0206389 | A1* | 7/2019 | Kwon .................. G10L 15/075 |

(Continued)

FOREIGN PATENT DOCUMENTS

| JP | 2008052449 | 3/2008 |
| JP | 2018073387 | 5/2018 |

*Primary Examiner* — Kevin Ky
(74) *Attorney, Agent, or Firm* — JCIPRNET

(57) ABSTRACT

An information processing apparatus includes a reception unit that receives information from a user in an interactive form and a selection unit that selects a first service for analyzing contents of natural language as a transmission destination of the information in a case where information from the user is input in natural language and selects a second service as an analysis destination of the received information in a case where information from the user is input as an image or a sound.

9 Claims, 16 Drawing Sheets

(56) References Cited

U.S. PATENT DOCUMENTS

| | | | |
|---|---|---|---|
| 2019/0279409 A1* | 9/2019 | Kim | G06F 16/53 |
| 2019/0325079 A1* | 10/2019 | Blake | G06F 16/3334 |
| 2019/0384466 A1* | 12/2019 | Lu | G06F 40/169 |
| 2020/0193493 A1* | 6/2020 | Nagar | G06Q 30/0627 |
| 2020/0272697 A1* | 8/2020 | Yasuoka | G06V 20/62 |
| 2020/0379731 A1* | 12/2020 | Pairis | G06F 3/167 |
| 2021/0383811 A1* | 12/2021 | Goscha | G06N 3/08 |
| 2022/0092130 A1* | 3/2022 | Vaananen | G06F 16/9536 |

* cited by examiner

FIG. 7

TIME POINT T5:
```
MONOCHROME IMAGE 60
BLACK LINE IMAGE 30
WRINKLED IMAGE 10
```
— RESULT OF ANALYSIS (NOT SHOWN)

TIME POINT T6:  OUTPUT SAMPLE IS DIRTY DUE TO BLACK LINE

1. YES
2. NO

TIME POINT T7:  PLEASE CHECK FOLLOWING URL
https://xxxxx.xxxx/xx

TAP URL TO DISPLAY LINK

TIME POINT T8:  IS TROUBLE SOLVED?

1. TROUBLE IS SOLVED
2. STILL OUTPUT SAMPLE IS DIRTY
3. CALL TO CONTACT CENTER

TIME POINT T9:  WE WILL CHECK ABOUT IMAGE AND CONTACT YOU AGAIN

TIME POINT T4: START CAMERA TO READY FOR PHOTOGRAPHING IMAGE

TIME POINT T5: MONOCHROME IMAGE 60 / BLACK LINE IMAGE 30 / WRINKLED IMAGE 10 — RESULT OF ANALYSIS (NOT SHOWN)

TIME POINT T5-1: IS IT MONOCHROME IMAGE?

1. YES

2. NO

TIME POINT T5-2: IS IT BLACK LINE IMAGE?

1. YES

2. NO

TIME POINT T7: PLEASE CHECK FOLLOWING URL
https://xxxxx.xxxx/xx

TAP URL TO DISPLAY LINK

FIG. 9

TIME POINT T4: | START CAMERA TO READY FOR PHOTOGRAPHING IMAGE

TIME POINT T5:
MONOCHROME IMAGE 60
BLACK LINE IMAGE 30
WRINKLED IMAGE 10
--- RESULT OF ANALYSIS (NOT SHOWN)

TIME POINT T6-1: 
PLEASE FROM FOLLOWING ITEMS
  MONOCHROME IMAGE
  BLACK LINE IMAGE
  WRINKLED IMAGE

1. MONOCHROME IMAGE
2. BLACK LINE IMAGE
3. WRINKLED IMAGE
4. OTHERS

TIME POINT T7: 
PLEASE CHECK FOLLOWING URL
https://xxxxx.xxxx/xx

TAP URL TO DISPLAY LINK

FIG. 11
TIME POINT T11:  WHAT WOULD YOU LIKE TO DO?
1. LET ME KNOW HOW TO USE APPARATUS
2. I WANT TO KNOW TROUBLE SOLUTION
3. OTHERS
TIME POINT T12:  PLEASE SELECT CONTENT
1. CORY
2. SCAN
3. ABOUT THIS (IMAGE OF PART)
TIME POINT T13: START CAMERA TO READY FOR PHOTOGRAPHING IMAGE
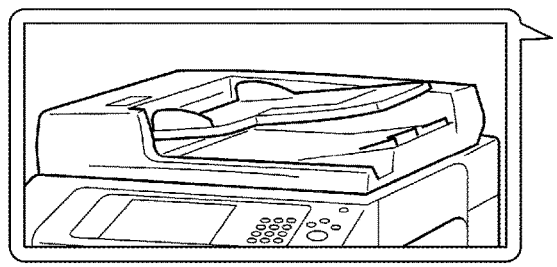
TIME POINT T14: DADF — RESULT OF ANALYSIS (NOT SHOWN)

FIG. 12
TIME POINT T15:  IS IT ABOUT DADF?
1. YES
2. NO
TIME POINT T16:  PLEASE CHECK FOLLOWING URL
https://xxxxx.yyyy/xx
TAP URL TO DISPLAY LINK
TIME POINT T17:  IS TROUBLE SOLVED?
1. TROUBLE IS SOLVED
2. TROUBLE IS NOT SOLVED
3. PHOTOGRAPH ONCE AGAIN
TIME POINT T18:  THANK YOU

FIG. 13

TIME POINT T21: WHAT WOULD YOU LIKE TO DO?

1. LET ME KNOW HOW TO USE APPARATUS

2. I WANT TO KNOW TROUBLE SOLUTION

3. OTHERS

⇩

TIME POINT T22: PLEASE SELECT CONTENT

1. ERROR MESSAGE IS DISPLAYED

2. OUTPUT TROUBLE

3. SCAN TROUBLE

4. APPARATUS MAIN BODY TROUBLE

5. OTHERS

⇩

TIME POINT T23: PLEASE LET US KNOW CONTENT OF ERROR ON SCREEN

1. PHOTOGRAPH

2. READ HELP

3. CALL TO CONTACT CENTER

⇩

TIME POINT T24: START CAMERA TO READY FOR PHOTOGRAPHING IMAGE

ERROR 027-513

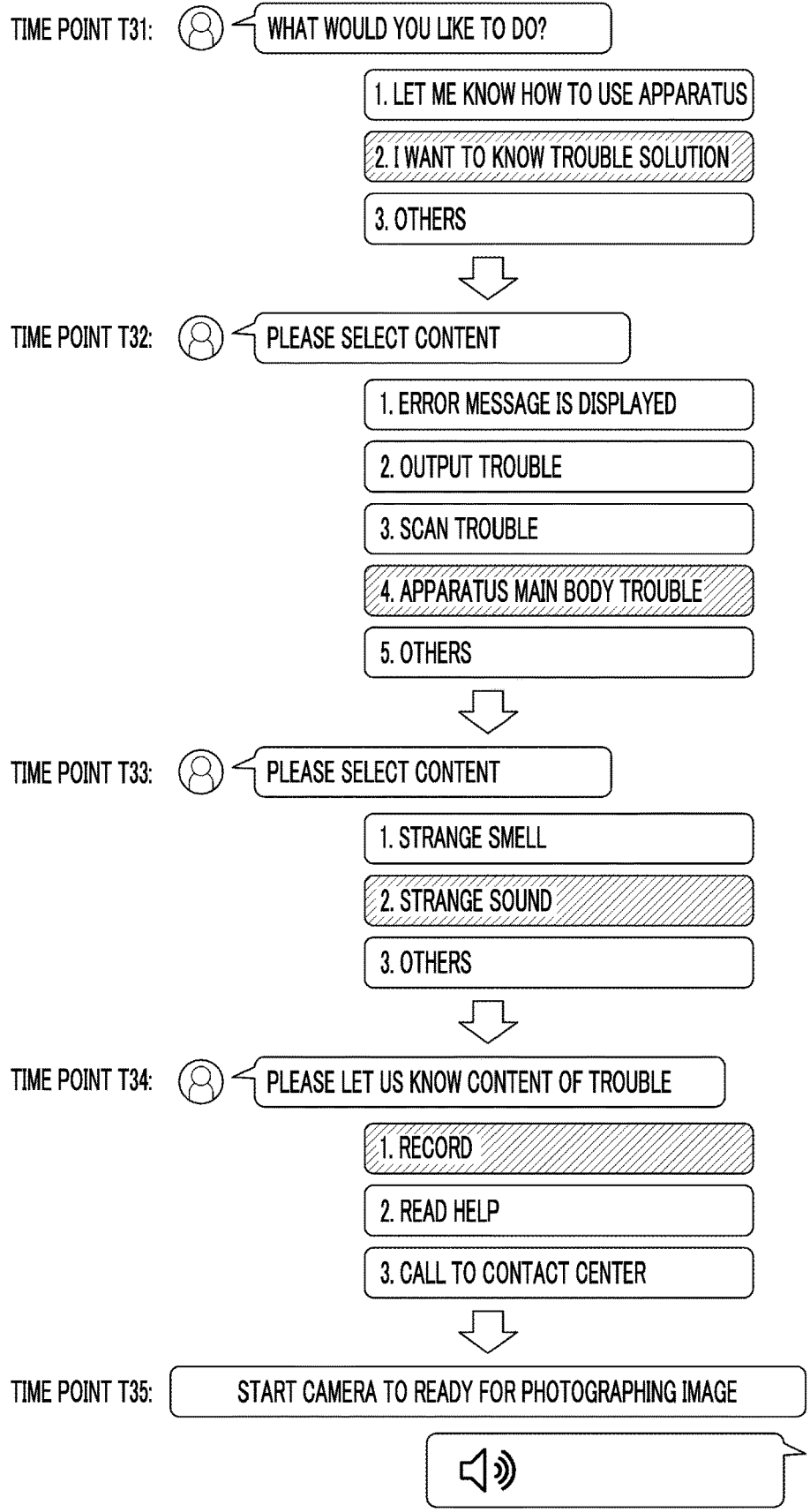

INFORMATION PROCESSING APPARATUS AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2019-032822 filed Feb. 26, 2019.

BACKGROUND

(i) Technical Field

The present invention relates to an information processing apparatus and a non-transitory computer readable medium storing a program.

(ii) Related Art

Apart of a customer service has been replaced from verbal response by an operator to an interactive automatic response service by text message. This technology is also called Chatbot. JP2008-052499A is an example of the related art.

SUMMARY

In a case where a message input by a user is limited to text, a user who does not know a name and the like for specifying a member, a part, a symptom, and the like that the user wants to inquire about may not need many conversations until an item that the user wants to inquire about is specified, and also there may be cases where the item the user wants to inquire about cannot be specified.

Aspects of non-limiting embodiments of the present disclosure relate to an information processing apparatus and a non-transitory computer readable medium storing information processing program that provide a more advanced service than using an interactive automatic response service based only on text.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a reception unit that receives information from a user in an interactive form, and a selection unit that selects a first service for analyzing contents of natural language as a transmission destination of the information in a case where information from the user is input in natural language and selects a second service as an analysis destination of the received information in a case where information from the user is input as an image or a sound.

BRIEF DESCRIPTION OF THE DRAWINGS

Exemplary embodiment(s) of the present invention will be described in detail based on the following figures, wherein:

FIG. 7 is a view illustrating interaction from time point T5 to time point T9 among messages appearing on the operation screen in a case of being asked how to solve stains that appear on printed matter;

FIG. 9 is a view illustrating another example of the interaction from time point T4 to time point T7 in FIGS. 6 and 7;

FIG. 11 is a view illustrating interaction from time point T11 to time point T14 among messages appearing on the operation screen in a case of being asked how to use a part whose name is not known;

FIG. 12 is a view illustrating interaction from time point T15 to time point T18 among messages appearing on the operation screen in a case of being asked how to use a part whose name is not known;

FIG. 13 is a view illustrating interaction from time point T21 to time point T24 among messages appearing on the operation screen in a case of being asked how to deal with an error screen;

FIG. 16 is a view illustrating a part of messages appearing on an operation screen in a case of being asked how to solve trouble that abnormal noise is heard from a main body.

DETAILED DESCRIPTION

Hereinafter, an exemplary embodiment of the present invention will be described in detail with reference to the accompanying drawings.

Exemplary Embodiment 1

Overall System Configuration

Figure 1:
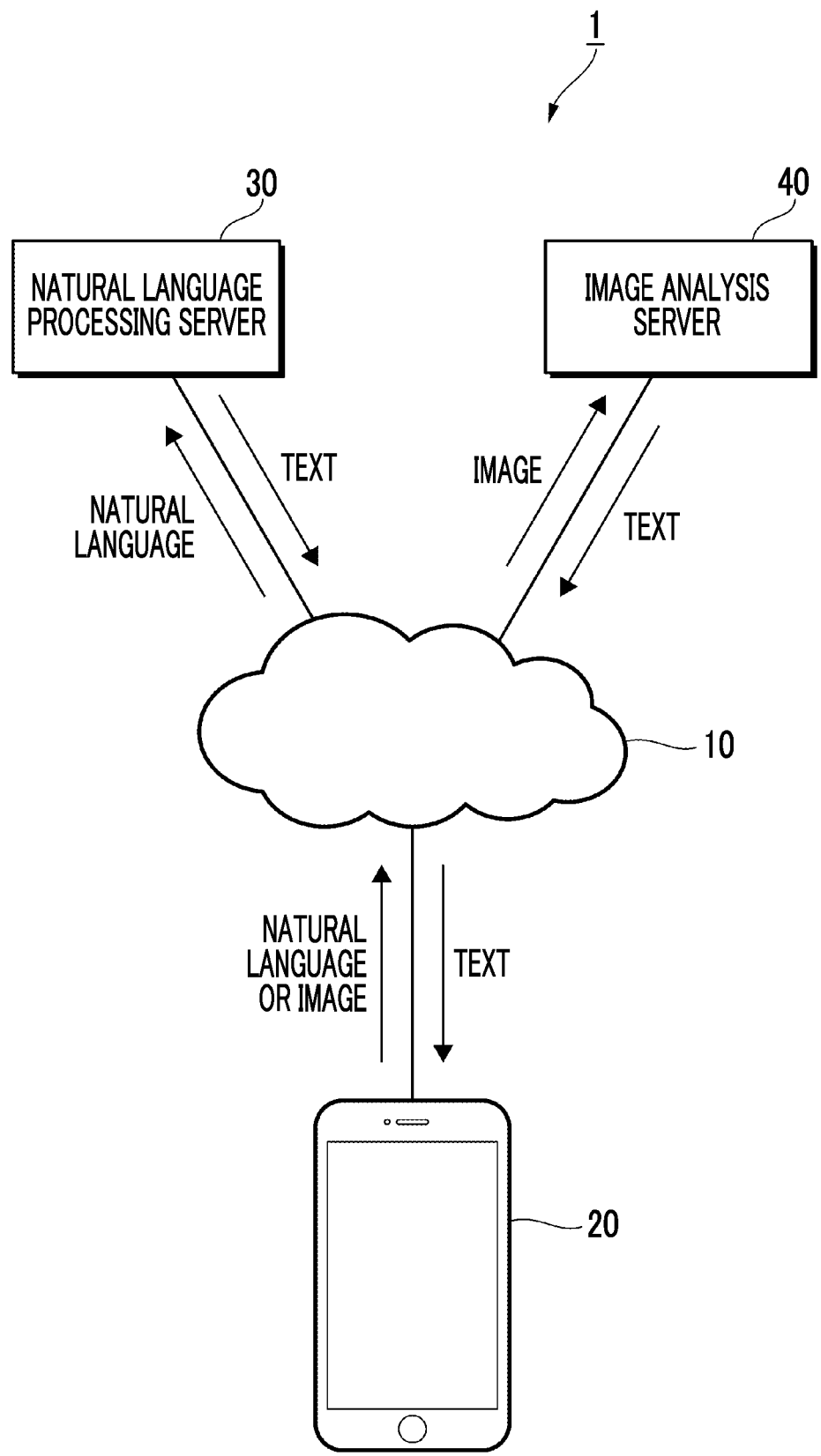
FIG. 1 is a view for explaining a conceptual configuration of an information processing system used in Exemplary embodiment 1.

FIG. 1 is a view for explaining a conceptual configuration of an information processing system 1 used in Exemplary embodiment 1. The information processing system 1 includes the Internet 10, a terminal device 20 operated by a user who is a user of a service, a natural language processing server 30 providing a service for analyzing natural language data, and an image analysis server 40 providing a service for analyzing image data.

In a case of this exemplary embodiment, natural language data includes one or both of data (hereinafter referred to as "text data") composed of character strings and data obtained by recording a user's voice. Voice data is expressed in a known audio file format such as WAV, MP3, and Advanced Audio Coding (AAC).

Image data includes one or both of still image data and moving image data.

The natural language processing server 30 performs natural language analysis of text data, and generates text data to be output to the terminal device 20 based on an analysis result and a scenario (hereinafter, referred to as an "interaction scenario") for interaction. The text data to be subjected to natural language processing includes, in addition to text data input by the terminal device 20, data obtained by converting voice data into text by voice recognition technology.

In the case of this exemplary embodiment, voice recognition is executed as preprocessing for natural language processing in the natural language processing server 30. When voice recognition is executed on the terminal device 20 side, the natural language processing server 30 receives text data as input.

Natural language processing in this exemplary embodiment is composed of morphological analysis, syntactic analysis, semantic analysis, context analysis, and the like. In the case of this exemplary embodiment, a part or whole of natural language processing is realized by artificial intelligence. Natural language processing may be realized by one server or may be realized by cooperation of a plurality of servers.

In the case of this exemplary embodiment, the interaction scenario of the natural language processing server 30 is prepared by a business operator who provides an interactive automatic response service. The interaction scenario prepared in the natural language processing server 30 is used for the analysis of natural language data input from the user and management of progress of interaction. The interaction scenario is composed of a collection of messages and options presented to the user according to the progress of interaction, information defining a transmission destination of information selected or input by the user, and the like. In this exemplary embodiment, exchange of messages until interaction relating to the message selected on an initial screen or a front screen of the interactive automatic response service ends is taken as the interaction scenario.

In the case of this exemplary embodiment, the interaction scenario on the terminal device 20 side is used to manage the progress of interaction for asking the user to select a server analyzing the user's input and to confirm the result of the analysis.

In this exemplary embodiment, the interaction scenario executed on the terminal device 20 side is also referred to as an interaction scenario for confirmation. The interaction scenario for confirmation also has a function of determining a transmission destination of information input by the user. For example, in a case where the input is text which is natural language data, the natural language processing server 30 is set as the transmission destination, and in a case where the input is an image which is non-natural language data, the image analysis server 40 is set as the transmission destination. In the case where the transmission destination is the image analysis server 40, the interaction scenario for confirmation in this exemplary embodiment transmits a purpose of analysis as well as image data.

The natural language processing server 30 in this exemplary embodiment is operated by the business operator who provides the interactive automatic response service. In the case of this exemplary embodiment, the natural language processing server 30 is realized as a cloud server. The natural language processing server 30 may be an on-premise type server. The service provided by the natural language processing server 30 is an example of a first service.

The image analysis server 40 analyzes an image in response to a request from the terminal device 20, and outputs the analysis result to the terminal device 20 as text data. The request transmitted from the terminal device 20 to the image analysis server 40 includes, for example, extraction of text contained in an image, recognition of an object being imaged, recognition of a symptom or a state appearing in an image being imaged, and the like. In the request here, the interaction scenario on the terminal device 20 side is determined according to the user's input.

In this exemplary embodiment, although a plurality of image analysis is realized by one image analysis server 40, an image analysis server 40 for extracting text, an image analysis server 40 for recognizing an object, an image analysis server 40 for recognizing a symptom or a state may be separately prepared. Image analysis corresponding to each purpose may be realized by one server, or may be realized by cooperation of a plurality of servers.

The image analysis server 40 in this exemplary embodiment is also operated by a business operator who provides the interactive automatic response service. The business operator who operates the image analysis server 40 and the business operator who operates the natural language processing server 30 may be different. Here, the business operator who operates the natural language processing server 30 and the business operator who operates the image analysis server 40 may have a relationship between a parent company and a subsidiary, or may have a capital relationship, may have a personal relationship although the business operators do not have a capital relationship, or may not have neither a capital relationship nor a personal relationship. For example, one business operator may be a business operator of a general-purpose image recognition service.

Also, in the case of this exemplary embodiment, the image analysis server 40 is realized as the cloud server. The image analysis server 40 may be the on-premises type server. The service provided by the image analysis server 40 is an example of a second service.

In the case of FIG. 1, the information processing system 1 is configured by one terminal device 20, but a plurality of terminal devices 20 may be used. The terminal device 20 here is an example of an information processing apparatus.

Configuration of Each Apparatus

Configuration of Server

The natural language processing server 30 and the image analysis server 40 are both computers connected to the Internet. Accordingly, the natural language processing server 30 and the image analysis server 40 are configured by a central processing unit (CPU) for executing a program, a read only memory (ROM) in which basic software, a basic input/output system (BIOS) and the like are stored, a random access memory (RAM) used as a work area, a hard disk device as a storage unit, a communication unit, and the like.

In artificial intelligence and the like for realizing natural language processing and image analysis, a learned model generated by machine learning or the like, and an application program for managing the progress of interaction based on an interaction scenario are stored in a storage unit.

Configuration of Terminal Device

The terminal device 20 is a portable terminal. The portable terminal includes, for example, a smartphone, a wearable terminal, and a notebook computer. The wearable terminal includes, for example, a bracelet-shaped terminal attached to a wrist and a glasses-shaped terminal attached to a head. The glasses-shaped terminal includes a transmission type terminal of the glasses-shaped terminal using a transparent plate in which a hologram optical element is incorporated. The hologram optical element has a property of transmitting light incident from the front and a property of refracting video image light propagating inside the transparent plate. For that reason, a user wearing a glasses-type terminal can visually recognize an image in which an image or text is superimposed on a scenery in front.

Figure 2:
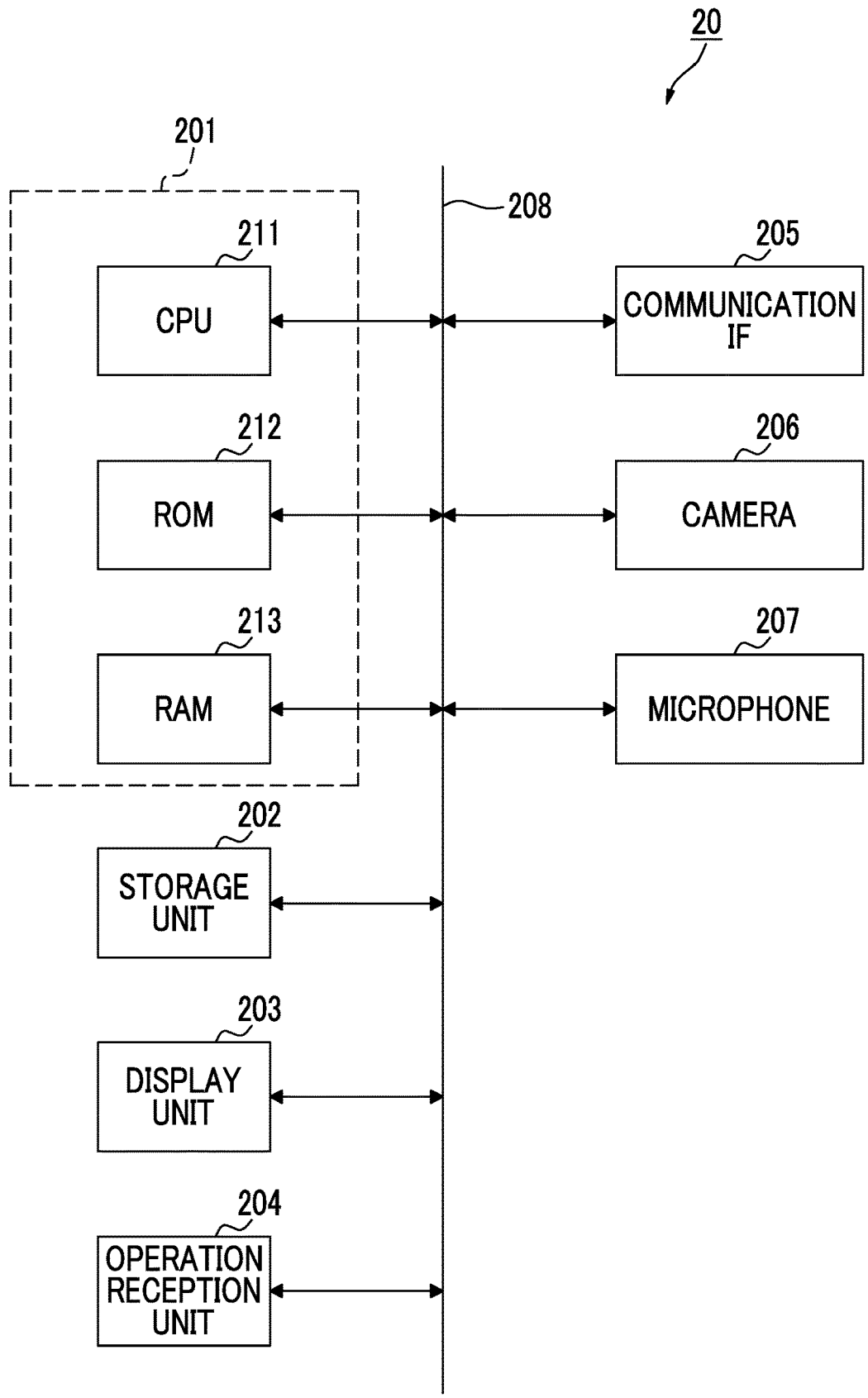
FIG. 2 is a diagram for explaining a configuration example of a terminal device.

FIG. 2 is a diagram for explaining a configuration example of the terminal device 20.

The terminal device 20 includes a control unit 201 that controls an operation of the entire device, a storage unit 202 that stores an interaction scenario, a program for realizing cooperation with the natural language processing server 30 (see FIG. 1), and the like, a display unit 203 used for displaying a user interface screen or the like, an operation reception unit 204 that receives a user's operation, a communication interface 205 for realizing communication through the Internet 10, a camera 206 that captures an image, and a microphone 207 used for voice and sound recording.

The control unit 201 includes a CPU 211 for executing a program, a ROM 212 in which firmware, BIOS, and the like are stored, and a RAM 213 used as a work area.

The storage unit 202 is configured by, for example, a hard disk device, which is a non-volatile rewritable storage medium, a semiconductor memory, or the like. The storage medium used as the storage unit 202 differs depending on a product form of the terminal device 20.

The display unit 203 is configured by, for example, a liquid crystal display or an organic EL display.

The operation reception unit 204 includes a touch sensor disposed on the surface of the display unit 203, a physical switch, a button, and the like disposed on the device main body. The operation reception unit 204 is an example of a reception unit.

The control unit 201, each unit, and the like are connected through a bus 208 or a signal line (not illustrated).

Figure 3:
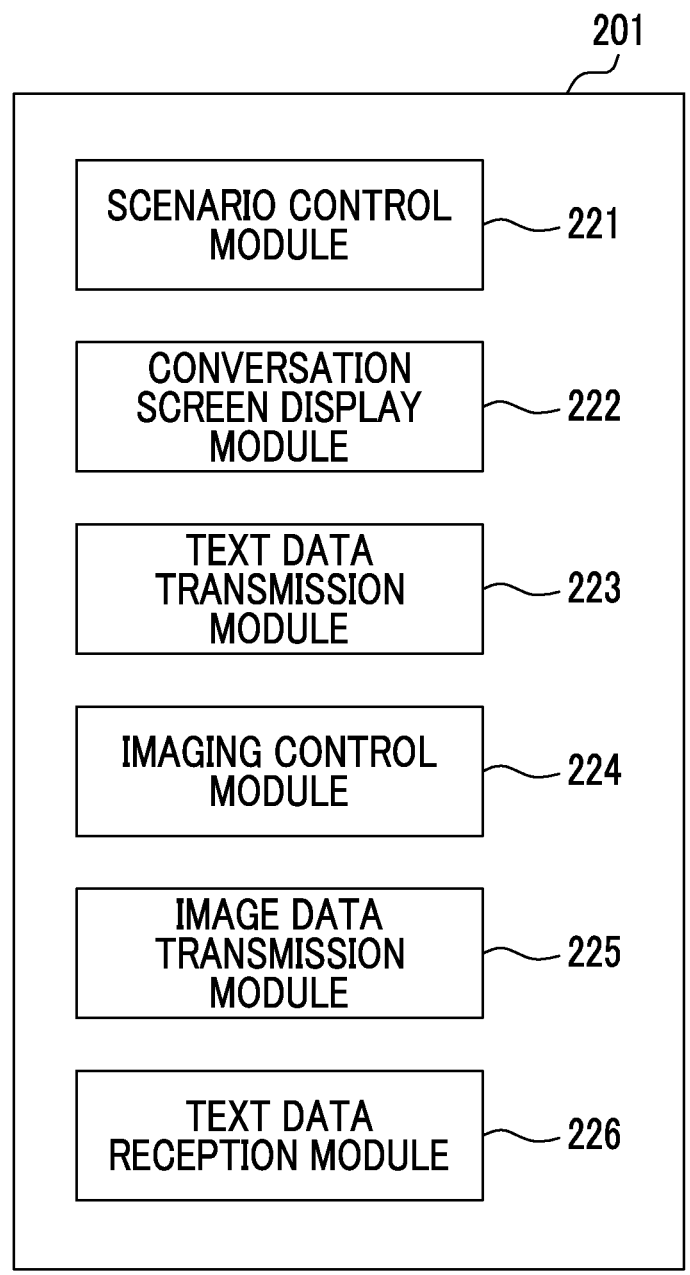
FIG. 3 is a diagram for explaining a functional configuration provided by a control unit of the terminal device used in Exemplary embodiment 1.

FIG. 3 is a diagram for explaining a functional configuration provided by the control unit 201 of the terminal device 20 used in Exemplary embodiment 1. The functional modules illustrated in FIG. 3 are realized through execution of a program by the CPU 211 (see FIG. 2). The functional modules illustrated in FIG. 3 are an example of functional modules provided by the control unit 201.

The control unit 201 in this exemplary embodiment has functions as a scenario control module 221 that controls the progress of interaction based on the interaction scenario for confirmation, an interaction screen display module 222 that displays text in an interactive form, a text data transmission module 223 that transmits text data to the natural language processing server 30 (see FIG. 1), an imaging control module 224 that controls imaging of a subject by the camera 206 (see FIG. 2), an image data transmission module 225 that transmits image data to the image analysis server 40 (see FIG. 1), and a text data reception module 226 that receives text data from the natural language processing server 30 or the image analysis server 40.

The scenario control module 221 shares, for example, display of a screen having "Yes" and "No" as options and reception processing of selection by the user. The number of options is not limited to two, and may be three or more. The scenario control module 221 shares an interaction scenario that receives selective confirmation by the user. In a case where the terminal device 20 does not share apart of the interaction scenario, a state in which the progress of the interaction scenario on the side of the natural language processing server 30 is stopped halfway continues for a long time, and a session is forcibly disconnected. When the session is disconnected, it is necessary to restart the interaction based on the interaction scenario from the beginning. The scenario control module 221 is an example of the reception unit and an example of the selection unit.

The interaction screen display module 222 displays input contents from a user side and the contents of an inquiry or response from the automatic response service side in a distinguishable manner. The interaction screen display module 222 in this exemplary embodiment arranges the contents input by the user in chronological order on the right side of the screen, and arranges the contents of the inquiry and response from the automatic response service side in chronological order on the left side of the screen. A chronological relationship is also maintained between a position where the contents input by the user are displayed and a position where the contents of the inquiry or response from the automatic response service are displayed. The interaction screen display module 222 is an example of the presentation unit.

The text data transmission module 223 transmits text data input by the user or text data received from the image analysis server 40 to the natural language processing server 30. Here, the text data input by the user also includes text data indicating contents selected by the user. The text data received from the image analysis server 40 represents the result of the analysis of the image data.

The imaging control module 224 executes activation of the camera 206, capturing of a captured image, and the like. In the case of capturing as a still image, an image captured when the user operates a shutter button is captured. In the case of capturing as a moving image, a moving image captured during a period during which the user operates a recording button in an ON state is captured. The captured image is stored in the storage unit 202 (see FIG. 2) as a data file of a predetermined format.

The image data transmission module 225 transmits the image data captured by the user to the image analysis server 40. The image data transmitted by the image data transmission module 225 also includes information designating the contents of the output to be obtained as the result of analysis. That is, the image data also includes information indicating a purpose of the analysis of the image.

The text data reception module 226 receives text data from the natural language processing server 30 and the image analysis server 40 which realize the automatic response service.

Figure 4:
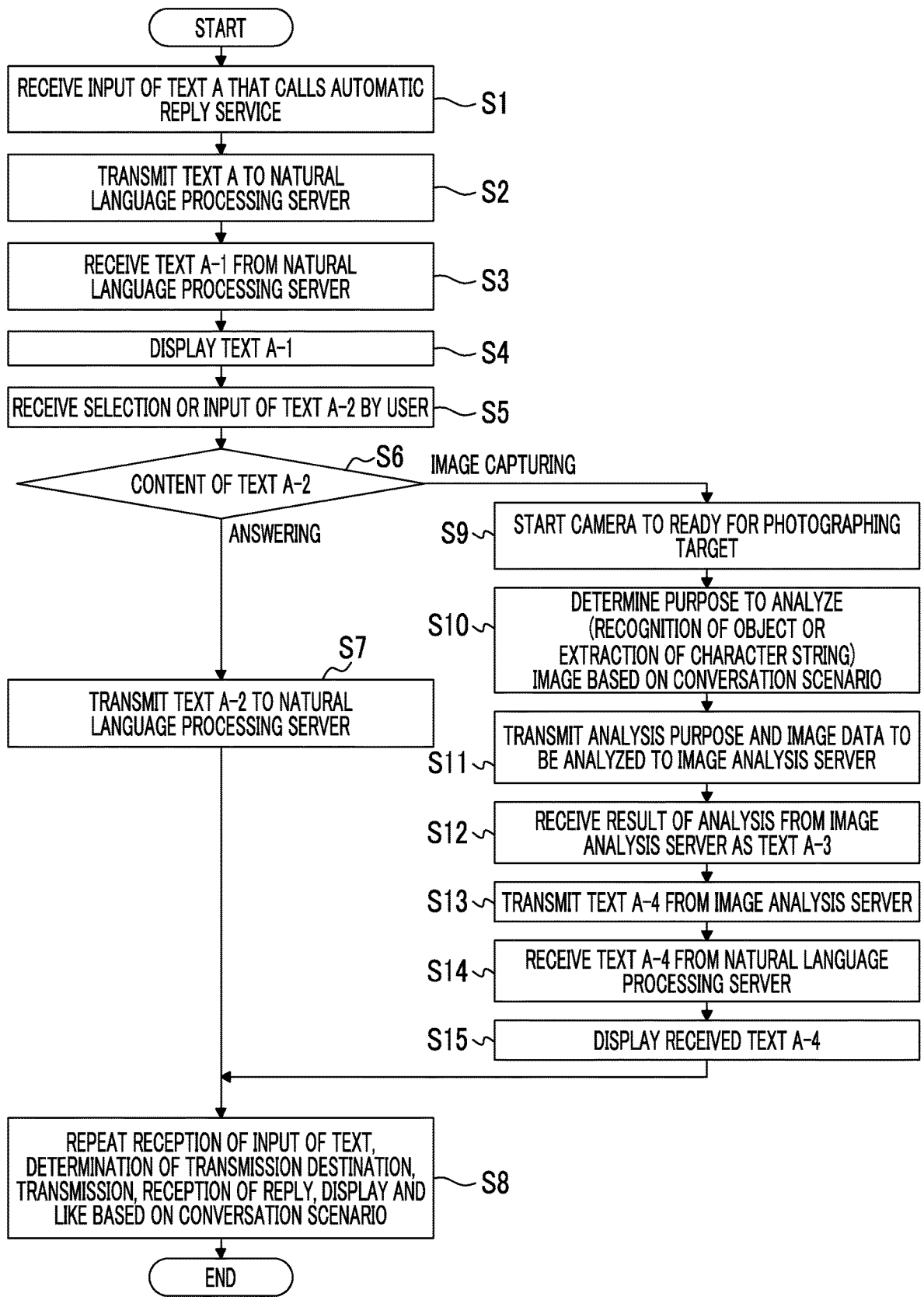
FIG. 4 is a flowchart for explaining a process operation performed by the terminal device used in Exemplary embodiment 1.

FIG. 4 is a flowchart for explaining a processing operation performed by the terminal device 20 used in Exemplary embodiment 1. The processing operation illustrated in FIG. 4 is realized by cooperation of the modules described above. The processing operation illustrated in FIG. 4 is an example of a processing operation executed based on the interaction scenario on the natural language processing server 30 side and the interaction scenario for confirmation on the terminal device 20 side. Accordingly, if the interaction scenario to be used is different, the contents of the processing operation are also different. The symbol S in the figure means a step.

First, the terminal device 20 receives an input of text A for invoking an interactive automatic response service (step S1). The text A here corresponds to the contents of an inquiry button or a help button operated by the user.

Next, the terminal device 20 transmits the text A to the natural language processing server 30 (see FIG. 1) (step S2). The natural language processing server 30 gives the result obtained by analyzing meaning of the received text A to the interaction scenario and transmits text A-1 corresponding to a position in current point in time to the terminal device 20. The text A-1 includes, for example, an inquiry sentence such as "Do you want to talk to something?". In a case where an option to be presented to the user is prepared in the interaction scenario, the option is also included in the text A-1.

The terminal device 20 receives the text A-1 from the natural language processing server 30 (step S3).

Next, the terminal device 20 displays the received text A-1 (step S4). The text A-1 is displayed on the display unit 203 (see FIG. 2).

Subsequently, the terminal device 20 receives selection or input of text A-2 by the user (step S5). The terminal device 20 having received the text A-2 determines whether the contents of the text A-2 are an answer or image capturing (step S6). This determination is prepared as a part of the interaction scenario for confirmation executed by the terminal device 20. As such, the terminal device 20 is provided with a function of determining the transmission destination.

In a case where the contents of the text A-2 are an answer, the terminal device 20 transmits the text A-2 to the natural language processing server 30 (step S7). The natural language processing server 30 having received the text A-2 thereafter repeats reception of input of text, determination of the transmission destination, transmission, reception of an answer, display, and the like based on the interaction scenario (step S8).

On the other hand, in a case where it is determined that the contents of the text A-2 are capturing of an image in step S6, the terminal device 20 activates the camera and waits for capturing of an image of a targeted object (step S9). While waiting for imaging, the terminal device 20 determines the purpose of analyzing the image based on the interaction scenario (step S10). The purpose here is, for example, recognition of an object, extraction of a character string, and the like.

Thereafter, the terminal device 20 transmits the analysis purpose and the image data to be analyzed to the image analysis server 40 (see FIG. 1) (step S11). In a case where the image analysis server 40 is prepared for each purpose to be analyzed, only the image data captured by the image analysis server 40 according to the purpose is transmitted.

The image analysis server 40 analyzes the received image data and transmits the analysis result to the terminal device 20 as text.

As such, in this exemplary embodiment, it is possible to control a service that processes information input by the user based on an interaction scenario on the terminal device side. In other words, in the case of this exemplary embodiment, the terminal device 20 selects a method of using a plurality of artificial intelligence services. In a case where the artificial intelligence service provided by the natural language processing server 30 determines to cooperate with other artificial intelligence services, the business operator of the interactive automatic response service cannot freely select to use other artificial intelligence services.

Accordingly, in the case of this exemplary embodiment, the business operator of the interactive automatic response service can freely designate a combination of a plurality of artificial intelligence services to provide a more advanced service.

Next, the terminal device 20 receives the result of the analysis from the image analysis server 40 as text A-3 (step S12).

In the case of the processing operation illustrated in FIG. 4, the terminal device 20 transmits the text A-3 to the natural language processing server 30 (step S13). The natural language processing server 30 analyzes meaning of the received text A-3, applies the result of the analysis to the interaction scenario, and determines text A-4 to be presented next.

The terminal device 20 receives the text A-4 from the natural language processing server (step S14), and then displays the received text A-4 (step S15).

Here, an operation example of transmitting to the natural language processing server 30 without confirming correctness or falseness of the text A-3 received in step S12 to the user is executed in a case where confirmation of the user is unnecessary because the text A-3 indicating the result of the image analysis is highly reliable, or a case where it is desired to display the text A-4 in which interaction with the user is more natural than the text A-3 itself indicating the result of the image analysis.

While reliability of the text A-3 is not high, a screen for prompting the user to confirm correctness or falseness of the text A-3 or a correct candidate is displayed before the text A-3 is transmitted to the natural language processing server 30.

Here, the "reliability is high" means a case where the result of the image analysis is correct and the number of times that the user has input exceeds a predetermined criteria, a case where the result of the image analysis for the total number of executions times of the image analysis is correct and a ratio of the number of input times exceeds a predetermined criteria, and the like.

As a method of confirming the result of the image analysis to the user, there are, for example, a method of displaying the whole of the text A-3 as it is, a method of displaying the text A-3 one by one in order from the candidates having high possibility. Which method to select may be determined according to the purpose of analyzing the image determined in the interaction scenario.

When text A-4 is displayed in step S15, the terminal device 20 proceeds to step S8 described above. That is, the terminal device 20 repeats reception of the input of the text, determination of the transmission destination, transmission, reception of the answer, display, and the like based on the interaction scenario.

Example of Operation Screen

In the following, an example of an operation screen displayed on the terminal device 20 will be described.

Display Example

Figure 5:
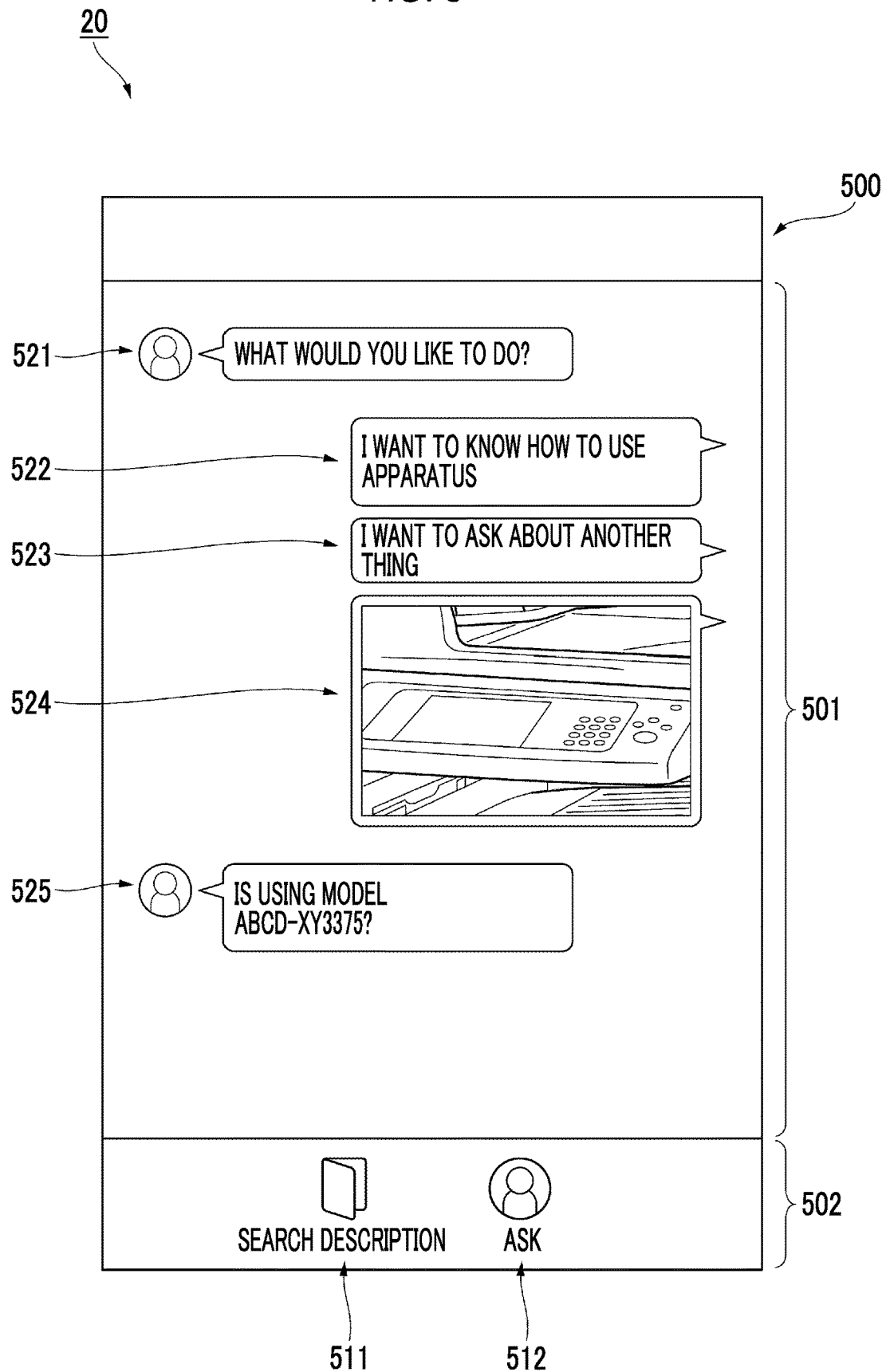
FIG. 5 is a view illustrating an example of an operation screen displayed on the terminal device in Exemplary embodiment 1.

FIG. 5 is a view illustrating an example of an operation screen 500 displayed on the terminal device 20 in Exemplary embodiment 1.

The operation screen 500 illustrated in FIG. 5 is composed of a message display area 501 displaying messages exchanged between the interactive automatic response service and the user in chronological order, and a service selection area 502 in which an icon for each service is displayed. In the case of FIG. 5, an icon 511 is for activating a service for searching for an explanation, and an icon 512 is for activating an interactive automatic response service. In FIG. 5, an explanatory note "Ask a question" is attached to the icon 512.

In the message display area 501 of FIG. 5, the messages exchanged with the interactive automatic response service are displayed in chronological order. In the case of FIG. 5, messages 521 and 525 from the interactive automatic response service are arranged to be aligned on the left side of the message display area 501. On the other hand, messages 522, 523, and 524 input by the user are arranged to be aligned on the right side of the message display area 501.

The messages 521 to 525 here are displayed according to the interaction scenario.

In the example illustrated in FIG. 5, in response to the operation of the icon 512, there is a question from the automatic response service side, "Do you want to talk to something?", in response to this question, the user inputs "I want to ask about how to use the apparatus" and "I want to make other consultations" in order, and subsequently, inputs an image obtained by imaging the image forming apparatus that is a target of the question. In response to these messages, the automatic response service outputs the result of the image analysis of "Is your model ABCD-XY3375?".

Here, the model which is the target of the question is specified by the text extracted from within the image. By being able to input an image in this way, the possibility of promoting specification of an apparatus, a symptom, or the like that is the target of a question is increased compared to the case of expressing only in natural language.

In Case of being Asked how to Solve Stains Appearing on Printed Matter (1)

Figure 6:
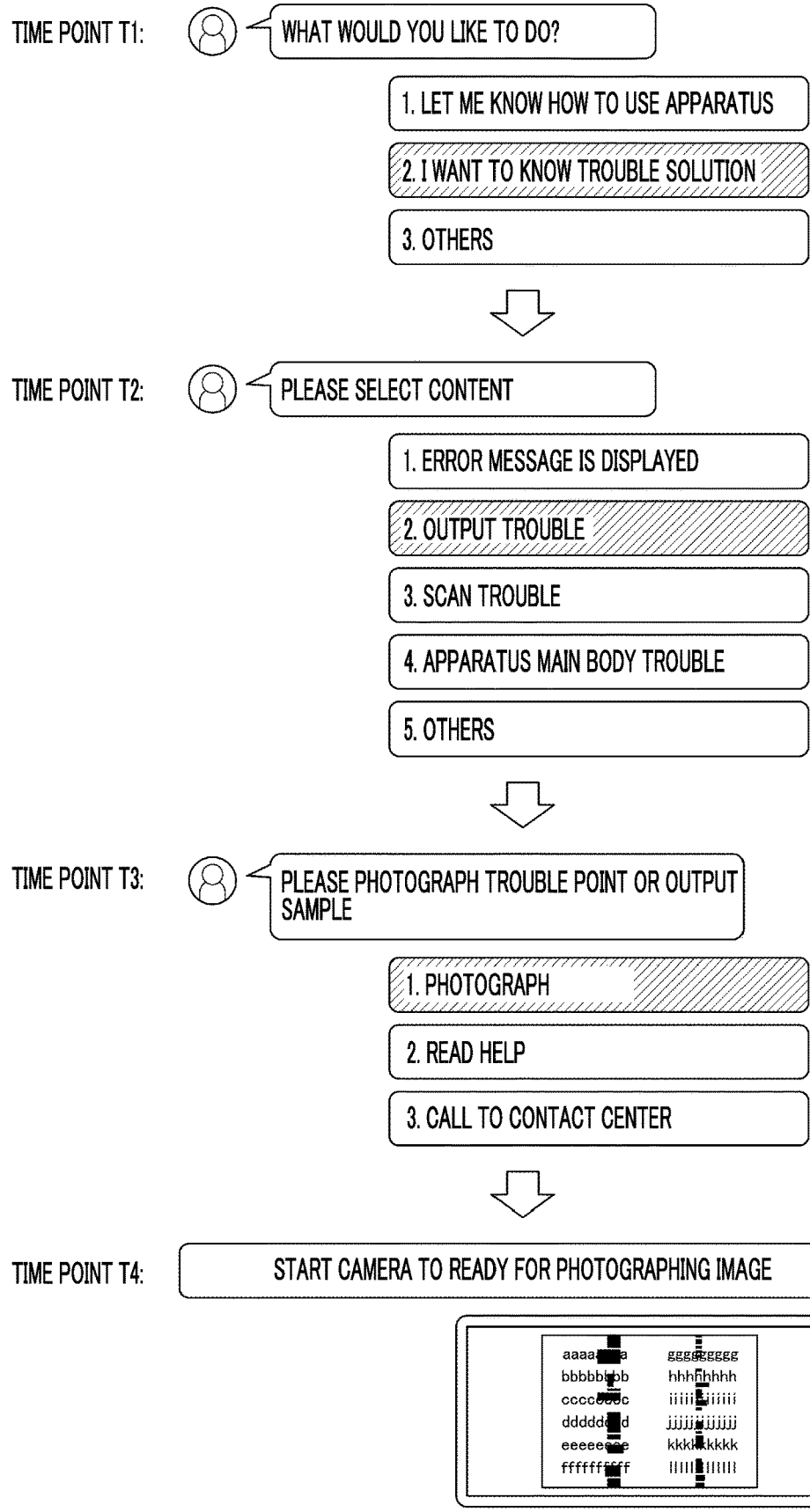
FIG. 6 is a view illustrating interaction from time point T1 to time point T4 among messages appearing on the operation screen in a case of being asked how to solve stains that appear on printed matter.

Here, FIGS. 6 and 7 will be used to describe a use example of the interactive automatic response service.

FIG. 6 is a view illustrating interaction from time point T1 to time point T4 of messages appearing on the operation screen in a case of being asked how to solve stains that appear on printed matter.

FIG. 7 is a view illustrating interaction from time point T5 to time point T9 of messages appearing on the operation screen in a case of being asked how to solve stains that appear on printed matter.

At time point T1, an initial screen associated with the operation of the icon 512 (see FIG. 5) is displayed. In the case of time point T1, three options used for narrowing down contents of the question are displayed. The options here are "1. I want to know how to use the apparatus", "2. I want to ask how to handle the trouble", and "3. Other". At time point T1, the user has selected "2. I want to ask how to handle the trouble".

The text displayed as a message is displayed based on the interaction scenario of the natural language processing server 30 (see FIG. 1). The same applies below.

At time point T2, a screen for inquiring the user about the contents of trouble is displayed. In the case of time point T2, five options are displayed along with an inquiry of "Please select the contents". The options here are "1. Error is displayed", "2. Output trouble", "3. Scan trouble", "4. Machine main body trouble", and "5. Other". At time point T2, the user has selected "2. Output trouble".

At time point T3, a screen for asking the user to select a desired action is displayed. In the example of time point T3, three options are displayed along with an inquiry of "Please photographs a trouble point or an output sample". The example of the time point T3 corresponds to a case where the recommended method of specifying trouble is image capturing. The options here are "1. Capture the image", "2. View Help", and "3. Call the contact center". At time point T3, the user has selected "1. Capture the image".

In the case of this exemplary embodiment, the transmission destination of information input by the user is determined by selection at time point T3. In a case where "1. Capture the image" is selected, the transmission destination is the image analysis server 40 (see FIG. 1), and in a case where "2. View Help", and "3. Call the contact center" are selected, the transmission destination is the natural language processing server 30 (see FIG. 1).

At time point T4, the terminal device 20 activates the camera 206 (see FIG. 2) and waits for the user to capture an image.

In the case of FIG. 6, an image of the printed matter captured by the user is displayed on the operation screen. The message is arranged on the right side of the operation screen because the message is input by the user. In the case of FIG. 6, a black vertical line which should not exist in the original image appears in the printed matter. The image here is transmitted to the image analysis server 40.

At time point T5, the result of the analysis by the image analysis server 40 is notified from the image analysis server 40 to the terminal device 20 as text data. In the case of this example, the result of the analysis is not displayed on the terminal device 20. In the case of FIG. 7, the result of the analysis is composed of types of images that have been estimated and information of likelihood of each image. Here, three possibilities of "black and white image 60", "black line image 30", and "wrinkle image 10" are illustrated. Here, the "black and white image 60" means that the possibility that the type of the estimated image is a black and white image is 60%.

In the text data transmitted by the image analysis server 40, all the results of the analysis may be described, or the results of the analysis having high possibilities of less than a predetermined number may be described. Of course, if the analysis result is one, the number of types of image described in the text data is one.

In the example of FIG. 7, instead of presenting the result of the analysis to the user as it is, the text data received as the result of the analysis is transmitted to the natural language processing server 30, the result of the analysis is evaluated from a viewpoint of the interaction scenario in progress, and a message that reflects user's intention is generated.

In the case of this exemplary embodiment, the user points out the output trouble at time point T2. For that reason, the natural language processing server 30 determines that the possibility of the black line image is higher than that of the black and white image in relation to trouble of the output sample. In this example, the natural language processing server 30 transmits text data of "The output sample is stained with the black line" to the terminal device 20.

A history of interaction referenced when generating a text sentence reflecting user's intention is not limited to an interaction scenario in progress. For example, the history of interaction in one or more interaction scenarios that have advanced immediately before the interaction scenario in progress may be referenced. For example, in a case where the "Please tell me how to use the apparatus" is selected in the previous interaction scenario, and "in-flight cleaning" is selected as a specific item, it is highly likely that the cause of trouble is related to the in-flight contamination. For that reason, it is possible to make representation of the message presented to the user closer to the user's intention.

At time point T6, a candidate for a problem estimated from an image captured by the user is presented to the user, and a screen for asking the user to confirm correctness or falseness of the candidate is displayed. In the example of time point T6, along with an inquiry of "The output sample is stained with a black line", two options corresponding to correctness or falseness are displayed. Specifically, two options are "1. Yes" and "2. No". At time point T6, the user has selected "1. Yes".

The result of selection is transmitted from the terminal device 20 to the natural language processing server 30. The natural language processing server 30 sends back information on a position of a screen of a solution method associated with the symptom of black line stains on the printed matter (symptom in which the black line is stained in the printed matter), as text data, to the terminal device 20.

The result of the selection by the user is also transmitted to the image analysis server 40. The image analysis server 40 uses the received determination of correctness or falseness for machine learning.

At time point T7, the position of the screen on which a method for solving trouble is described is presented to the user. In the example of time point T7, "Please check the following URL" and "https://xxxxx.xxxx/xx" are displayed. A hyperlink is embedded in the URL.

Here, the user taps the URL to display a link destination. The contents of these operations are transmitted from the terminal device 20 to the natural language processing server 30 as text data and are used for the progress of the interaction scenario.

When the user closes a window displaying information of the link destination, occurrence of an event of closing the window is transmitted from the terminal device 20 to the natural language processing server 30 as text data.

At time point T8, a screen for confirming whether information required to solve trouble has been obtained or whether the problem has been resolved is displayed. In the example of time point T8, three options are displayed along with an inquiry of "Is it solved?". The options here are "1. Solved", "2. The output sample is still stained", and "3. Call the contact center".

Text constituting the screen displayed at time point T8 is transmitted as text data notified from the natural language processing server 30.

At time point T8, the user has selected "2. The output sample is still stained". This selection is transmitted from the terminal device 20 to the natural language processing server 30 as text data. The natural language processing server 30 processes the received text data, and transmits a text sentence to be presented to the user as text data.

At time point T9, a screen indicating a policy for dealing with trouble is displayed. In the case of time point T9, a message of "We will contact you again after confirming the photo" is displayed. The photo here is the image captured at time point T4. In this exemplary embodiment, the natural language processing server 30 designates a computer or the like of a service staff as a designation destination of the image data captured at time point T4 to the terminal device 20.

In Case of being Asked how to Solve Stains Appearing on Printed Matter (2)

Here, with reference to FIG. 8, another example of the interaction in the case of being asked how to solve stains appearing on printed matter will be described.

Figure 8:
FIG. 8 is a view illustrating another example of the interaction from time point T4 to time point T7 in FIGS. 6 and 7.

FIG. 8 is a diagram illustrating another example of the interaction from time point T4 to time point T7 in FIGS. 6 and 7.

In the case of the example of the interaction described above, although the message generated by referring to the history of interaction exchanged in the interaction scenario in progress is displayed as the result of the analysis from the image analysis server 40 (see FIG. 1), in this example, candidates with high possibility among the result of analysis are preferentially presented to the user.

Also in the case of FIG. 8, as the result of the analysis, the possibility of black and white image is 60%, the possibility of black line image is 30%, and the possibility of wrinkle image is 10%.

Accordingly, at time point T5-1, two options corresponding to correctness or falseness are displayed, along with an inquiry of "Is it a black and white image" which has the highest possibility among the three candidates". Specifically, two options are "1. Yes" and "2. No". At time point T5-1, the user has selected "2. No".

At time point T5-2, two options corresponding to correctness or falseness are displayed, along with an inquiry of "Is it a black line image?" which is the second highest possibility among the three candidates. Specifically, two options are "1. Yes" and "2. No". At time point T5-2, the user has selected "1. Yes".

The subsequent steps are the same as the contents of time point T7 to time point T9 described in FIG. 7.

In Case of being Asked how to Solve Stains Appearing on Printed Matter (3)

Subsequently, with reference to FIG. 9, another example of interaction in the case of being asked how to solve stains appearing on printed matter will be described.

FIG. 9 is a diagram illustrating another example of the interaction from time point T4 to time point T7 in FIGS. 6 and 7.

In the case of the another example of the interaction described above, although the message generated by referring to the history of interaction exchanged in the interaction scenario in progress is displayed as the result of the analysis from the image analysis server 40 (see FIG. 1), in this example, in this example, the result of the analysis received from the image analysis server 40 is presented to the user as it is.

Also in the case of FIG. 9, as the result of the analysis, the possibility of black and white image is 60%, the possibility of black line image is 30%, and the possibility of wrinkle image is 10%.

At time point T6-1, three candidates are displayed as they are, and four options for asking the user to make a selection are displayed. In the example of time point T6-1, along with an inquiry of "Please select from the following", four options of "1. Black and white image", "2. Black line image", "3. Wrinkle image", and "4. Other" are displayed. This display may be executed based on the interaction scenario of the terminal device 20, or may be executed as a result of processing by the natural language processing server 30.

At time point T6-1, the user has selected "2. Black line image".

The subsequent steps are the same as the contents of time point T7 to time point T9 described in FIG. 7.

In Case of being Asked how to Solve Stains Appearing on Printed Matter (4)

Subsequently, with reference to FIG. 10, another example of interaction in the case of being asked how to solve stains appearing on printed matter will be described.

Figure 10:
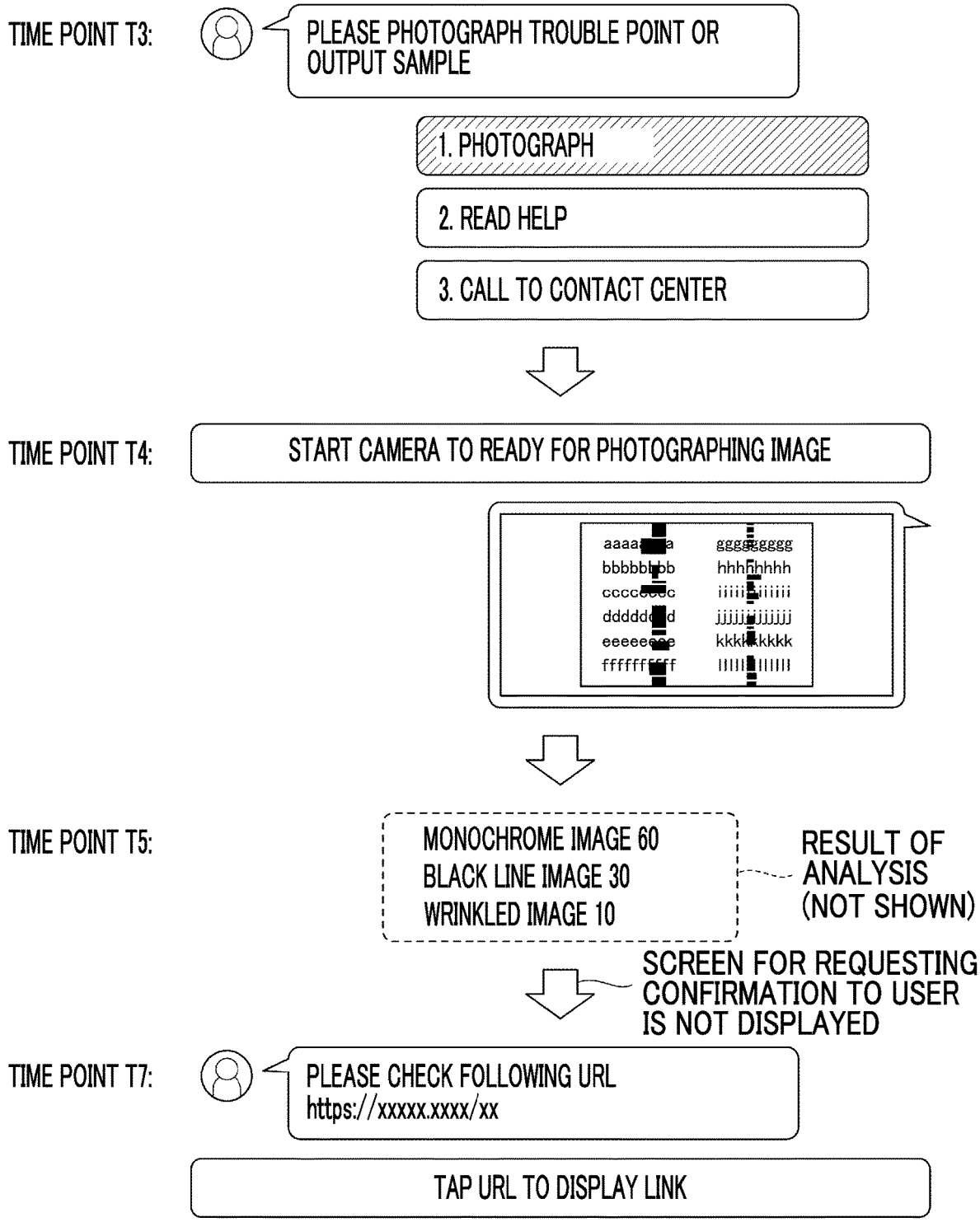
FIG. 10 is a view illustrating another example of the interaction from time point T3 to time point T7 in FIGS. 6 and 7.

FIG. 10 is a diagram illustrating another example of the interaction from time point T3 to time point T7 in FIGS. 6 and 7.

In the case of the interaction example described above, although the message generated by referring to the history of interaction exchanged in the interaction scenario in progress is displayed as the result of the analysis from the image analysis server 40 (see FIG. 1), in this example, after accuracy of the result of the analysis is increased, confirmation to the user is also unnecessary.

In this example, measures are displayed without confirming to the user whether the analysis result is correct or incorrect.

In the case of FIG. 10, as the result of the analysis, the possibility of black and white image is 5%, the possibility of black line image is 90%, and the possibility of wrinkle image is 5%.

Also in the case of this example, the terminal device 20 transmits the text data received as the result of the analysis to the natural language processing server 30. In a case where the possibility of the black line image is higher than a predetermined reference value, the natural language processing server 30 transmits text data, which indicates the position of the screen on which the method of solving the stain due to the black line is described, to the terminal device 20.

For that reason, in the case of FIG. 10, the screen at time point T7 is displayed next to the screen at time point T5.

The subsequent steps are the same as the contents of time point T7 to time point T9 described in FIG. 7.

In Case where User want to Know how to Use Part that User does not Know Name

Here, with reference to FIG. 11, another use example of the interactive automatic response service will be described.

FIG. 11 is a view illustrating interaction from time point T11 to time point T14 among messages appearing on the operation screen in a case of being asked how to use a part whose name is not known.

FIG. 12 is a view illustrating interaction from time point T15 to time point T18 among messages appearing on the operation screen in a case of being asked how to use a part whose name is not known.

At time point T11, an initial screen associated with the operation of the icon 512 (see FIG. 5) is displayed. In the case of time point T11, three options used for narrowing down contents of the question are displayed. The options here are "1. I want to know how to use the apparatus", "2. I want to ask how to handle the trouble", and "3. Other". At time point T11, the user has selected "1. I want to know how to use the apparatus".

At time point T12, a screen for inquiring of the user about a target of usage is displayed. In the case of time point T12, three options are displayed along with an inquiry of "Please select the contents". The options here are "1. Copy", "2. Scan", and "3. About this (imaging of a part)". At time point T12, the user has selected "3. About this (imaging of a part)".

At time point T13, the terminal device 20 activates the camera 206 (see FIG. 2), and waits for the user to capture an image.

In the case of FIG. 11, an image of an automatic conveyance mechanism of a document imaged by the user is displayed on the operation screen. The message is arranged on the right side of the operation screen because the image is input by the user. The image here is transmitted to the image analysis server 40.

At time point T14, the image analysis server 40 notifies the terminal device 20 of the result of the analysis of the image analysis server 40 as text data. In the case of this example, the result of the analysis is not displayed on the terminal device 20. In the case of FIG. 11, the result of the analysis is only "DADF". A duplex automatic document feeder (DADF) is a name of an automatic conveyance mechanism of a document.

Data representing the result of this analysis may be transmitted from the terminal device 20 to the natural language processing server 30, or may be displayed on the operation screen according to the interaction scenario on the terminal device 20 side as it is.

At time point T15, a screen that shows the user the name of the part that is the subject of the image captured by the user, and asks the user to confirm correctness or falseness of the candidate is displayed. In the example of time point T15, two options corresponding to correctness or falseness are displayed along with an inquiry of "It is about DADF". Specifically, two options are "1. Yes" and "2. No". At time point T15, the user has selected "1. Yes".

At time point T16, the position of the screen on which the usage of the DADF is described is presented to the user. In the example of time point T16, "Please check the following URL" and "https://xxxxx.yyyy/xx" are displayed. A hyperlink is embedded in the URL.

Here, the user taps the URL to display the link destination. The contents of these operations are transmitted from the terminal device 20 to the natural language processing server 30 as text data, and are used for the progress of the interaction scenario.

When the user closes the window displaying information of the link destination, the event of closing the window is transmitted from the terminal device 20 to the natural language processing server 30 as text data.

At time point T17, a screen for confirming whether necessary information on the usage has been obtained is displayed. In the example of time point T17, three options are displayed along with an inquiry of "Is it solved?". The options here are "1. Solved", "2. Not solved", and "3. Capture the image again".

The text constituting the screen displayed at time point T17 is transmitted as text data notified from the natural language processing server 30.

At time point T17, the user has selected "1. Solved". This selection may be transmitted from the terminal device 20 to the natural language processing server 30 as text data, or may be given to an interaction scenario on the terminal device 20 side.

At time point T18, a word of thanks for solving trouble is displayed. In the example of time point T18, "Thank you" is displayed.

In Case of being Asked how to Deal with Error Screen

Here, with reference to FIG. 13 and FIG. 14, another use example of the interactive automatic response service will be described.

FIG. 13 is a view illustrating interaction from time point T21 to time point T24 among messages appearing on the operation screen in a case of being asked how to deal with an error screen.

Figure 14:
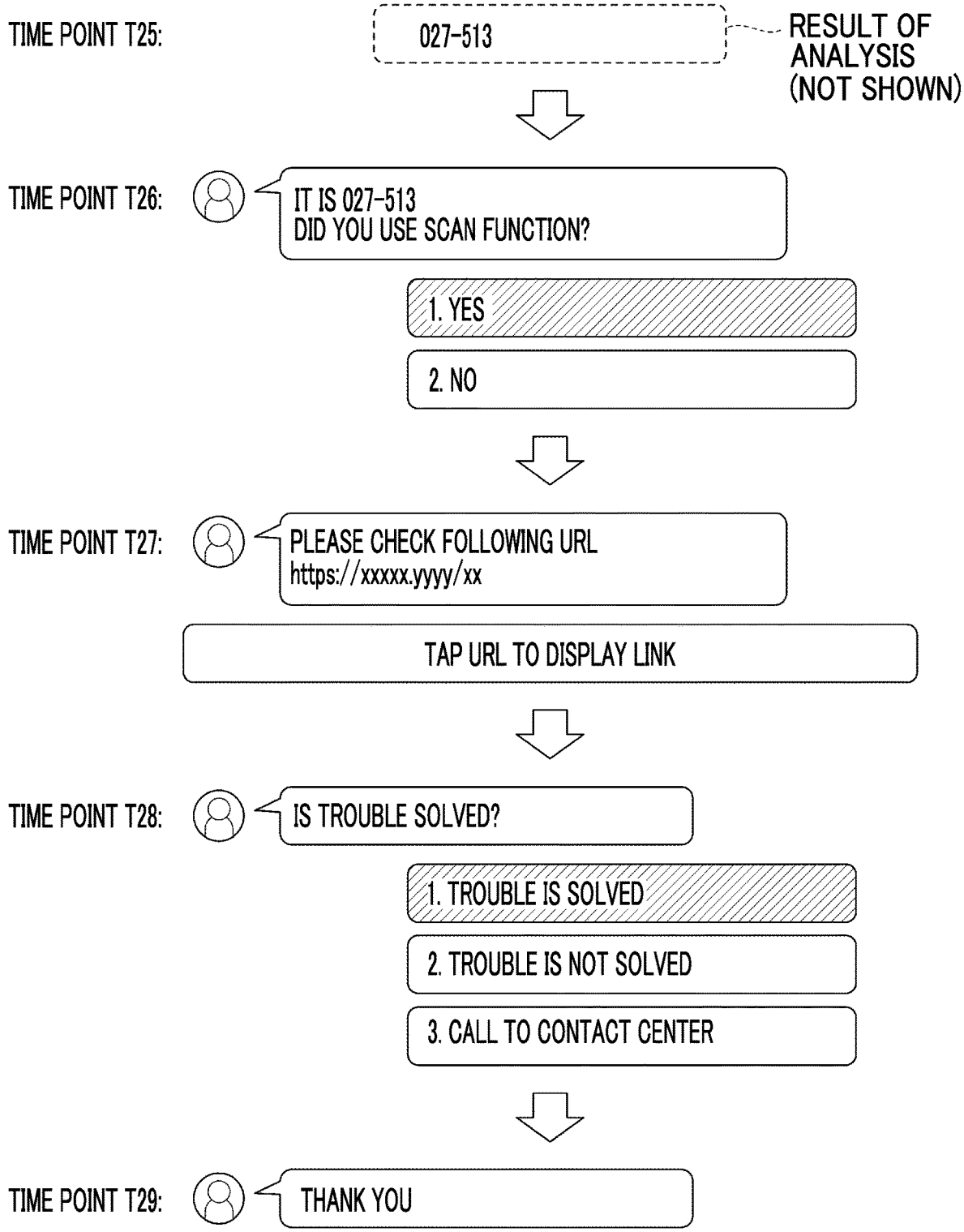
FIG. 14 is a diagram illustrating interaction from time point T25 to time point T29 among messages appearing on the operation screen in a case of being asked how to deal with an error screen.

FIG. 14 is a diagram illustrating interaction from time point T25 to time point T29 among messages appearing on the operation screen in a case of being asked how to deal with an error screen.

At time point T21, an initial screen associated with the operation of the icon 512 (see FIG. 5) is displayed. In the case of time point T21, three options used to narrow down contents of the question are displayed. The options here are "1. I want to know how to use the apparatus", "2. I want to ask how to handle the trouble", and "3. Other". At time point T21, the user has selected "2. I want to know how to handle the trouble".

At time point T22, a screen for inquiring of the user about the contents of trouble is displayed. In the case of time point T22, five options are displayed along with the inquiry of "Please select the contents". The options here are "1. Error is displayed", "2. Output trouble", "3. Scan trouble", "4. Machine main body trouble", "5. Other". At time point T22, the user has selected "1. Error is displayed".

At time point T23, a screen for inquiring of the user about the contents of the error is displayed. In the case of time point T23, three options are displayed along with the inquiry of "Please tell me the contents of the error display on the screen". The options here are "1. Capture the image", "2. View help", and "3. Call the contact center". At time point T23, the user has selected "1. Capture the image".

At time point T24, the terminal device 20 activates the camera 206 (see FIG. 2), and waits for the user to capture an image.

In the case of FIG. 13, an image of an error screen captured by the user is displayed.

At time point T25, the result of the analysis by the image analysis server 40 is notified from the image analysis server 40 to the terminal device 20 as text data. In the case of this example, the result of the analysis is not displayed on the terminal device 20. In the case of FIG. 14, the result of the analysis is a character string included in the error screen. Here, "027-513" is read.

The interaction scenario on the terminal device 20 side does not have a message for a character string representing the contents of the error and thus, the character string here is transmitted to the natural language processing server 30.

At time point T26, the character string read from the image of the error screen captured by the user is shown to the user, and a screen for asking the user to confirm correctness or falseness of the character string is displayed. In the example of time point T26, along with an inquiry of "It is 027-513. Did you use the scan function?", two options corresponding to correctness or falseness are displayed. Specifically, the two options are "1. Yes" and "2. No". At time point T26, the user has selected "1. Yes".

At time point T27, the position of the screen on which a method for solving trouble is described is presented to the user. In the example of time point T27, "Please check the following URL" and "https://xxxxx.zzzz/xx" are displayed. A hyperlink is embedded in the URL.

Here, the user taps the URL to display the link destination. The contents of these operations are transmitted from the terminal device 20 to the natural language processing server 30 as text data, and are used for the progress of the interaction scenario.

At time point T28, a screen to confirm whether the information required to solve the error has been obtained is displayed. In the example of time point T28, three options are displayed along with an inquiry of "Is it solved?". The options here are "1. Solved", "2. Not solved", and "3. Call the contact center".

At time point T28, the user has selected "1. Solved". This selection may be transmitted from the terminal device 20 to the natural language processing server 30 as text data, or may be given to the interaction scenario on the terminal device 20 side.

At time point T29, a word of thanks for solving the error is displayed. In the example of time point T29, "Thank you" is displayed.

Exemplary Embodiment 2

In the case of Exemplary embodiment 1, although available artificial intelligence services are the natural language processing service and the image analysis service, in this exemplary embodiment, a case where a service for analyzing sounds other than natural language can be used will be described.

Figure 15:
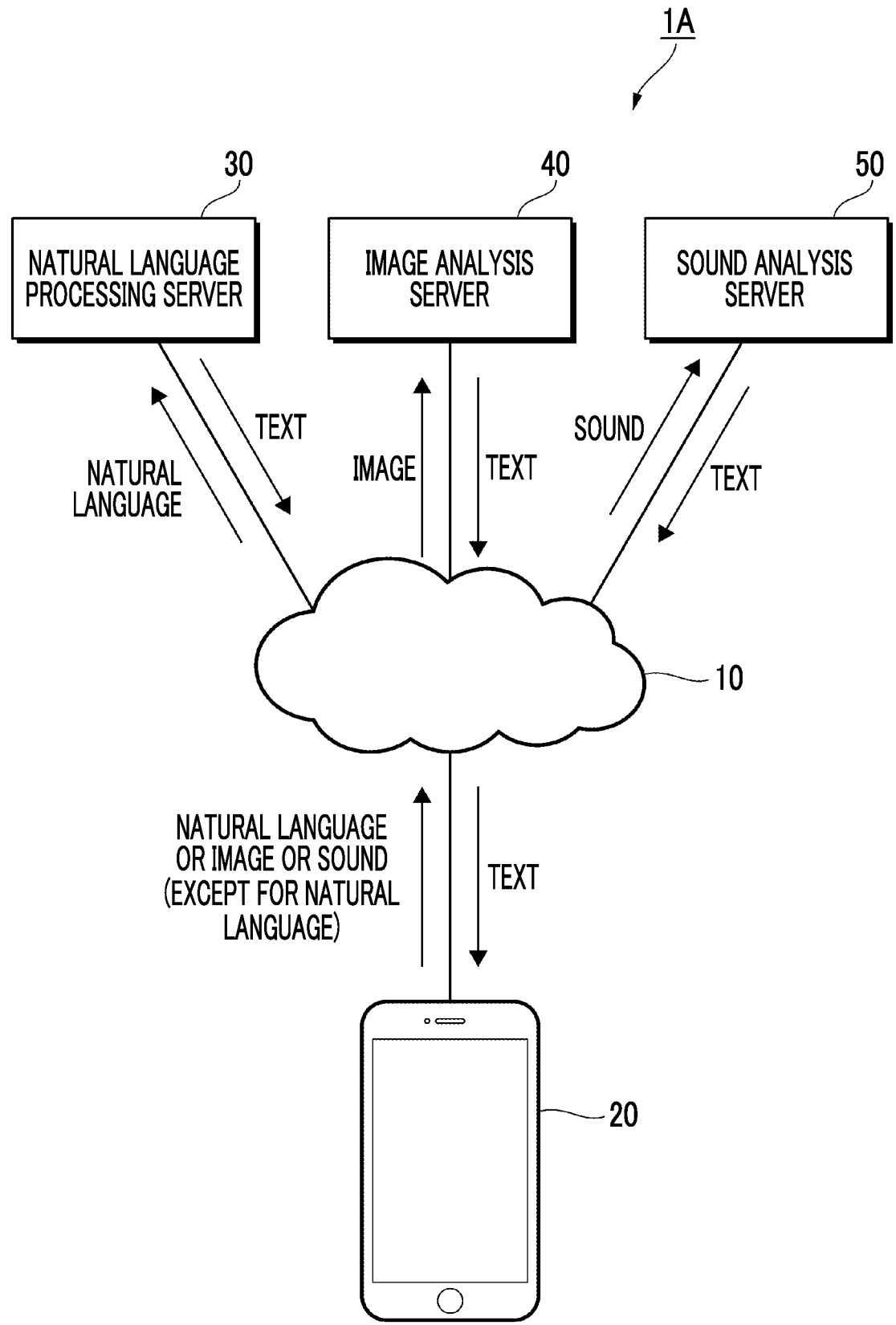
FIG. 15 is a view for explaining a conceptual configuration of an information processing system used in Exemplary embodiment 2.

FIG. 15 is a view for explaining a conceptual configuration of an information processing system 1A used in Exemplary embodiment 2. In FIG. 15, reference numerals corresponding to those in FIG. 1 are given to components corresponding to those in FIG. 1.

In the case of the information processing system LA, the natural language processing server 30, the image analysis server 40, and a sound analysis server 50 are provided on the Internet 10.

The sound analysis server 50 in this exemplary embodiment considers sounds other than voice as an analysis target (a target of analysis). The voice is transmitted to the natural language processing server 30 as in Exemplary embodiment 1.

The terminal device 20 executes designation of the transmission destination.

FIG. 16 is a view illustrating a part of messages appearing on an operation screen in a case of being asked how to solve trouble that an abnormal sound is heard from a main body.

At time point T31, an initial screen associated with the operation of the icon 512 (see FIG. 5) is displayed. In the case of time point T31, along with the inquiry of "Do you want to talk to something?", three options to be used for narrowing down the contents of the question are displayed. The options here are "1. I want to know how to use the apparatus", "2. I want to ask how to handle the trouble", and "3. Other". At time point T31, the user has selected "2. I want to ask how to handle the trouble".

In the case of time point T32, a screen for inquiring the user about the contents of trouble is displayed. In the case of time point T32, five options are displayed along with an inquiry of "Please select the contents". The options here are "1. Error is displayed", "2. Output trouble", "3. Scan trouble", "4. Machine main body trouble", "5. Other". At time point T32, the user has selected "4. Machine main unit trouble".

At time point T33, a screen for inquiring the user about more detailed contents is displayed. In the case of time point T33, three options are displayed along with the inquiry of "Please select the contents". The options here are "1. There is a strange smell", "2. There is a strange sound", and "3. Other". At time point T33, the user has selected "2. There is a strange sound".

At time point T34, a screen for asking the user to select a desired action is displayed. In the example of time point T34, three options are displayed along with the inquiry of "Please give me the contents of trouble". The options here are "1. Record", "2. View help", and "3. Call the contact center". At time point T34, the user has selected "1. Record".

At time point T35, the terminal device 20 activates the microphone 207 (see FIG. 2) and waits for the user to record a sound.

In the case of FIG. 16, a reproducing button for confirming the recorded sound is displayed. A file of the recorded sound is transmitted to the sound analysis server 50, and the result of analysis is transmitted to the terminal device 20 as text data. Thereafter, a screen for asking the user to confirm the analysis result is displayed on the operation screen.

Other Exemplary Embodiments

As mentioned above, although exemplary embodiments of the invention are described, the technical scope of the present disclosure is not limited to the scope described in the exemplary embodiments described above. It is also apparent from the description of the claims that modifications or improvements made to the exemplary embodiments described are also included in the technical scope of the present disclosure.

In the exemplary embodiments described above, the natural language processing server 30 (see FIGS. 1 and 15) is operated by a business operator providing the interactive automatic response service, but a business operator who operates the natural language processing server 30 may be different from the business operator who provides the interactive automatic response service.

In the exemplary embodiments described above, as illustrated in FIG. 5, although the case where the messages from the interactive automatic response service are arranged along the left side of the operation screen and the messages input by the user are arranged along the right side of the operation screen has been described, the messages may be displayed in chronological order by changing a background color or the like.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor, configured to:
receive information input by a user in an interactive form through an input interface, wherein the information input by the user includes a first information and a second information subsequent to the first information;
select a first service for analyzing contents of natural language as a transmission destination of the information in a case where the information from the user is input in natural language and select a second service as an analysis destination of the received information in a case where the information from the user is input as an image or a sound made from a machine; and
in response to a plurality of candidates are notified according to a result of an analysis by the second service, present the plurality of candidates in an order from high probability to low probability on a display,
wherein, in response to the reception of the first information, the processor is configured to transmit the first information to the first service to analyze text of the first information to determine a meaning of the first information, and receive an inquiry corresponding to the first information from the first service to inquire the second information from the user,
wherein, in response to the second information being the image or the sound from the machine, the processor is configured to transmit the second information to the second service, and receive the plurality of candidates from the second service each corresponds to different scenarios reflected by the second information,
wherein the second information are obtained and analyzed in addition to the determined meaning of the first information as to determine an inquiry of user.

2. The information processing apparatus according to claim 1,
wherein the processor is further configured to present a result of an analysis by the second service to the user.

3. The information processing apparatus according to claim 1,
wherein the processor is further configured to present a result of an analysis by the second service to the user based on a history of interaction.

4. The information processing apparatus according to claim 3,
wherein in a case where a plurality of candidates are notified as the result of the analysis, the processor is further configured to determine a candidate to be presented to the user based on the history of interaction.

5. The information processing apparatus according to claim 4,
wherein the processor is further configured to proceed with a scenario without presenting the result of the analysis to the user in a case where reliability of the result of the analysis by the second service is high.

6. The information processing apparatus according to claim 1,
wherein a result of an analysis by the second service is not presented to the user.

7. The information processing apparatus according to claim 6,
wherein the result of the analysis by the second service is transmitted to the first service according to a scenario in progress, and the result of the analysis by the first service and contents according to the scenario in progress are presented.

8. A non-transitory computer readable medium storing a program causing a computer to execute a process, the process comprising:
a function of receiving information from a user in an interactive form, wherein the information input by the user includes a first information and a second information subsequent to the first information; and
a function of selecting a first service for analyzing contents of natural language as a transmission destination of the information in a case where information from the user is input in natural language and selecting a second service as an analysis destination of the received information in a case where information from the user is input as an image or a sound made from a machine; and
in response to a plurality of candidates are notified according to a result of an analysis by the second service, presenting the plurality of candidates in an order from high probability to low probability on a display,
wherein, in response to the reception of the first information, transmitting the first information to the first service to analyze text of the first information to determine a meaning of the first information, and receiving an inquiry corresponding to the first information from the first service to inquire the second information from the user,
wherein, in response to the second information being the image or the sound made from the machine, transmitting the second information to the second service, and receiving the plurality of candidates from the second service each corresponds to different scenarios reflected by the second information, wherein the second information are obtained and analyzed in addition to the determined meaning of the first information as to determine an inquiry of user.

9. An information processing apparatus comprising:

reception means for receiving information from a user in an interactive form, wherein the information input by the user includes a first information and a second information subsequent to the first information;

selection means for selecting a first service for analyzing contents of natural language as a transmission destination of the information in a case where information from the user is input in natural language and selects a second service as an analysis destination of the received information in a case where information from the user is input as an image or a sound made from a machine; and presenting means for, in response to a plurality of candidates are notified according to a result of an analysis by the second service, presenting the plurality of candidates in an order from high probability to low probability on a display;

wherein, in response to the reception of the first information, transmitting the first information to the first service to analyze text of the first information to determine a meaning of the first information, and receiving an inquiry corresponding to the first information from the first service to inquire the second information from the user, wherein, in response to the second information being the image or the sound made from the machine, transmitting the second information to the second service, and receiving the plurality of candidates from the second service each corresponds to different scenarios reflected by the second information, wherein the second information are obtained and analyzed in addition to the determined meaning of the first information as to determine an inquiry of user.

* * * * *